United States Patent
Wang et al.

(10) Patent No.: US 11,056,692 B2
(45) Date of Patent: Jul. 6, 2021

(54) BATTERY ELECTRODE, METHOD FOR MAKING THE SAME AND HYBRID ENERGY STORAGE DEVICE USING THE SAME

(71) Applicants: Tsinghua University, Beijing (CN); HON HAI PRECISION INDUSTRY CO., LTD., New Taipei (TW)

(72) Inventors: Da-Tao Wang, Beijing (CN); Li Sun, Beijing (CN); Ke Wang, Beijing (CN); Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/373,107

(22) Filed: Apr. 2, 2019

(65) Prior Publication Data

US 2019/0305311 A1 Oct. 3, 2019

(30) Foreign Application Priority Data

Apr. 3, 2018 (CN) .......................... 201810298532.6

(51) Int. Cl.
    *H01M 4/587* (2010.01)
    *H01M 4/48* (2010.01)
    (Continued)

(52) U.S. Cl.
    CPC ............ *H01M 4/587* (2013.01); *H01G 11/36* (2013.01); *H01G 11/46* (2013.01); *H01G 11/86* (2013.01);
    (Continued)

(58) Field of Classification Search
    CPC ............................... H01G 11/48; H01G 11/50
    (Continued)

(56) References Cited

U.S. PATENT DOCUMENTS

| | | |
|---|---|---|
| 7,413,723 B2 | 8/2008 | Niu et al. |
| 2006/0024503 A1 | 2/2006 | Wong et al. |

(Continued)

FOREIGN PATENT DOCUMENTS

| | | |
|---|---|---|
| CN | 101173117 | 5/2008 |
| CN | 102040212 | 5/2011 |

(Continued)

OTHER PUBLICATIONS

He et al., "Porous carbon nanotubes improved sulfur composite cathode for lithium-sulfur battery", J Solid State Electrochem (2013), 17, pp. 1641-1647.*

(Continued)

*Primary Examiner* — Khanh T Nguyen
(74) *Attorney, Agent, or Firm* — ScienBiziP, P.C.

(57) ABSTRACT

The present invention relates to a battery electrode. The battery electrode comprises a plurality of carbon nanotubes and a plurality of transition metal oxide nanoparticles. The plurality of transition metal oxide nanoparticles are chemically bonded to the plurality of carbon nanotubes through carbon-oxygen-metal (C—O—M) linkages, wherein the metal being a transition metal element. The present invention also relates a method for making the battery electrode and a hybrid energy storage device using the battery electrode.

14 Claims, 14 Drawing Sheets

(51) Int. Cl.
*H01M 4/04* (2006.01)
*H01G 11/36* (2013.01)
*H01G 11/46* (2013.01)
*H01G 11/86* (2013.01)
*H01M 4/1393* (2010.01)
*H01M 4/02* (2006.01)

(52) U.S. Cl.
CPC ....... *H01M 4/0404* (2013.01); *H01M 4/1393* (2013.01); *H01M 4/483* (2013.01); *H01M 2004/021* (2013.01)

(58) Field of Classification Search
USPC .............................................. 429/149, 231.8
See application file for complete search history.

(56) References Cited

U.S. PATENT DOCUMENTS

| | | |
|---|---|---|
| 2008/0160409 A1 | 7/2008 | Ishida et al. |
| 2011/0095237 A1 | 4/2011 | Liu et al. |
| 2011/0096465 A1 | 4/2011 | Zhou et al. |
| 2013/0171502 A1* | 7/2013 | Chen ...................... H01G 11/48 429/149 |
| 2014/0099554 A1* | 4/2014 | Inoue ..................... H01G 11/50 429/231.8 |
| 2015/0180029 A1 | 6/2015 | Bosnyak et al. |

FOREIGN PATENT DOCUMENTS

| | | |
|---|---|---|
| CN | 105289578 | 2/2016 |
| CN | 107454815 | 12/2017 |
| JP | 2014-523613 | 9/2014 |
| TW | 201133524 | 10/2011 |

OTHER PUBLICATIONS

Hu et al., "Pore Size Distribution of Single-Walled Carbon Nanotubes", Ind. Eng. Chem. Res. (2004), 43, pp. 708-711.*

Song et al., "The effect of pore structure and surface properties of carbon nanotube films on the performance of a lithium sulfur battery", Carbon Letters (2018), vol. 27, pp. 12-17.*

Wang et al., Facile synthesis of MnO2/CNT nanocomposite and its electrochemical performance for supercapacitors, Materials Science and Engineering B 176 (2011) 1073-1078.

* cited by examiner

BATTERY ELECTRODE, METHOD FOR MAKING THE SAME AND HYBRID ENERGY STORAGE DEVICE USING THE SAME

CROSS-REFERENCE TO RELATED APPLICATIONS

This application claims all benefits accruing under 35 U.S.C. § 119 from China Patent Application No. 201810298532.6, filed on Apr. 3, 2018, in the China National Intellectual Property Administration, the contents of which are hereby incorporated by reference. This application is related to applications entitled, "CARBON NANOTUBE-TRANSITION METAL OXIDE COMPOSITE AND METHOD FOR MAKING THE SAME", filed Apr. 2, 2019 Ser. No. 16/373,093.

FIELD

The present disclosure relates to a battery electrode, a method for making the battery electrode and a hybrid energy storage device using the battery electrode.

BACKGROUND

Lithium-ion batteries and supercapacitors are common energy storage devices. Lithium-ion batteries typically provide a high energy density. However, a cycle life of lithium-ion batteries is short and a power density of lithium-ion batteries is low. On the contrary, the supercapacitors character in long cycle life and high power density, but the supercapacitors are limited for their low energy density. Therefore, it is highly desirable to develop a single electrochemical energy storage device to achieve the advantages of battery-like energy and supercapacitor-like power simultaneously.

Transition metal oxides have been intensively studied as promising candidates of electrode materials in lithium-ion batteries to satisfy market demand of high power density due to their capacitive-like lithium-ions storage behaviors and high theoretical capacitance. However, an application of transition metal oxides for high energy density has been hampered by their poor electronic conductivity, limited lithium-ion diffusion coefficient, slow reaction kinetics and poor structural stability during cycles.

In order to solve the above problems of the transition metal oxides, it has been proposed to use nano-scale electrode particles to form high-power lithium-ion batteries. The use of nano-scale electrode particles comprises the following advantages: first, a diameter of nanoparticles tends to be relatively small, so a diffusion path of lithium-ion can be significantly shortened; second, the ultrathin nanoparticles can mechanically buffer a volume change during a charge/discharge process, thus an electrode integrity can be maintained and a cycle stability can be strengthened. At present, a binder such as polyvinylidene fluoride (PVDF) is often used to bond transition metal oxides and conductive agents together to prepare an ultrathin material, and the ultrathin material is used as an electrode. However, the transition metal oxides usually have a large size (greater than 50 nm). The transition metal oxides is poorly dispersed in the electrode and is easy to agglomerate. The van der Waals force between the transition metal oxides and the binders is weak. Therefore, the transition metal oxides can easily fall off from the electrode, resulting in a sharp drop of battery capacitance.

What is needed, therefore, is to provide a battery electrode, to solve the problems discussed above.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

FIG. 5 inset shows pore size distribution diagrams of the air-CNT and the $MnO_2$/aCNT composite film structure.

FIG. 16 inset shows discharge/charge voltage profiles curves of the $2^{nd}$ cycle, the $500^{th}$ cycle, and the $1000^{th}$ cycle of the $MnO_2$/aCNT electrode, respectively.

FIG. 17(a) shows cyclic voltammetry (CV) curves at different scan rates from 0.2 to 20 mV $s^{-1}$; FIG. 17(b) shows b-value determination at different potentials around current peaks; FIG. 17(c) shows CV curve at 20 mV $s^{-1}$. FIG. 17(d) shows Mn 3s XPS diagram before and after discharge.

DETAILED DESCRIPTION

Figure 1:
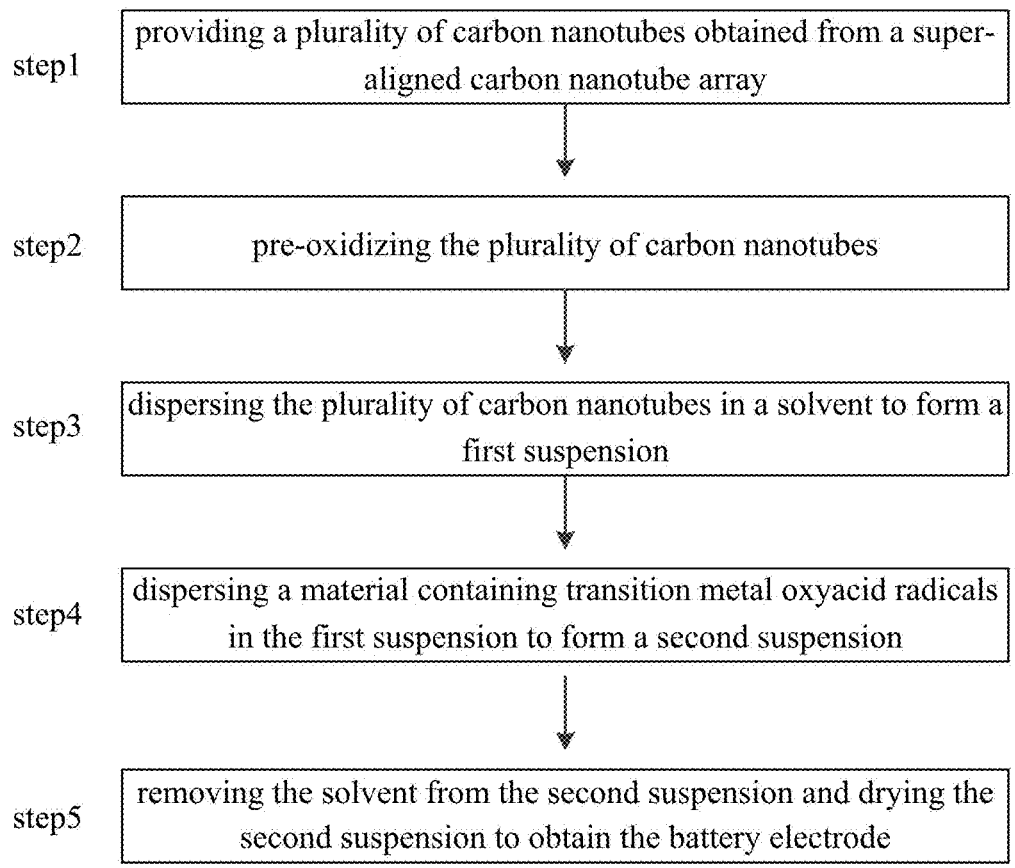
FIG. 1 shows a flow chart of a method for making a battery electrode according to one embodiment.

The disclosure is illustrated by way of embodiments and not by way of limitation in the FIGures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different FIGures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

A battery electrode is provided according to one embodiment. The battery electrode comprises a plurality of carbon nanotubes and a plurality of transition metal oxide nanoparticles. The plurality of transition metal oxide nanoparticles are chemically bonded to the plurality of carbon nanotubes through carbon-oxygen-metal (C—O-M) linkages, and the metal being a transition metal element.

A diameter of each of the plurality of carbon nanotubes is not limited. The plurality of carbon nanotubes can be a plurality of single-walled carbon nanotubes or a plurality of multi-walled carbon nanotubes. In one embodiment, the plurality of carbon nanotubes are a plurality of multi-walled carbon nanotubes. The plurality of carbon nanotubes are entangled and closely combined with each other to form a free-standing film structure. The term "free-standing structure" implies, but is not limited to, that the carbon nanotube film structure can sustain the weight of itself when it is hoisted by a portion thereof without any significant damage to its structural integrity. The free-standing film structure can serve as a conductive network and an attachment carrier for the transition metal oxide nanoparticles.

The plurality of transition metal oxide nanoparticles can be distributed in the battery electrode uniformly. The transition metal oxide is not limited and can be selected from a group consisting of manganese dioxide ($MnO_2$), titanium dioxide ($TiO_2$), ferroferric oxide ($Fe_3O_4$), chromic oxide ($Cr_2O_3$), cobaltosic oxide ($Co_3O_4$), molybdenum dioxide ($MoO_2$), vanadium dioxide ($VO_2$), and combinations thereof.

Surfaces of the plurality of carbon nanotubes can define a plurality of pores. The plurality of transition metal oxide nanoparticles are deposited on surfaces of the plurality of carbon nanotubes or in the plurality of pores.

Because the plurality of carbon nanotubes are entangled with each other to form a freestanding structure. The free-standing structure is high conductive and flexible. In addition, the plurality of transition metal oxide nanoparticles are bonded to the plurality of carbon nanotubes through chemical bonds and are not easily detached from the carbon nanotubes. Therefore, the battery electrode need no current collector, conductive agent, and binder, so that a weight and a size of the battery electrode can be reduced. In one embodiment, the battery electrode only consists of the plurality of carbon nanotubes and the plurality of transition metal oxide nanoparticles. In another embodiment, the battery electrode further comprises a small amount of structural water and metal ions. The metal ions can be alkali metal ions such as potassium ions (K+). The metal ions and the structural water can stabilize the battery electrode during cycles and maintain a cycle performance of the battery electrode.

In the present disclosure, the carbon nanotubes and the transition metal oxide nanoparticles are tightly boned together through C—O-M chemical bonds. The chemical bonds can prevent the transition metal oxide nanoparticles from falling off the carbon nanotubes at a high charge and discharge current.

Referring to FIG. 1, a method for making the battery electrode comprises the following steps:

step 1, providing a plurality of carbon nanotubes obtained from a super-aligned carbon nanotube array;

step 2, pre-oxidizing the plurality of carbon nanotubes;

step 3, dispersing the plurality of carbon nanotubes in a solvent to form a first suspension;

step 4, dispersing a material containing transition metal oxyacid radicals in the first suspension to form a second suspension; and step 5, removing the solvent from the second suspension and drying the second suspension to obtain the battery electrode.

The step 1~5 are described in detail as followings.

In the step 1, the plurality of carbon nanotubes is provided. The plurality of carbon nanotubes is obtained from a super-aligned carbon nanotube array.

A diameter and a length of each of the plurality of carbon nanotubes are not limited. The plurality of carbon nanotubes can be a plurality of single-walled carbon nanotubes or a plurality of multi-walled carbon nanotubes. In one embodiment, the plurality of carbon nanotubes are a plurality of multi-walled carbon nanotubes in order to prevent the pre-oxidized carbon nanotubes from being broken in the step 4.

The super-aligned carbon nanotube array is prepared by a chemical vapor deposition method, and the method comprises the following steps: (a) providing a substantially flat and smooth substrate; (b) forming a catalyst layer on the substrate; (c) annealing the substrate with the catalyst layer in air at a temperature ranging from about 700° C. to about 900° C. for about 30 to 90 minutes; (d) heating the substrate with the catalyst layer to a temperature ranging from about 500° C. to about 740° C. in a furnace with a protective gas therein; (e) supplying a carbon source gas to the furnace for about 5 to 30 minutes and growing the super-aligned carbon nanotube array on the substrate.

In step (a), the substrate can be a P-type silicon wafer, an N-type silicon wafer, or a silicon wafer with a film of silicon dioxide thereon. In one embodiment, a 4-inch P-type silicon wafer is used as the substrate.

In step (b), the catalyst can be made of iron (Fe), cobalt (Co), nickel (Ni), or any alloy thereof.

In step (e), the super-aligned carbon nanotube array consists of the plurality of carbon nanotubes, and the plurality of carbon nanotubes are parallel to each other and perpendicular to the substrate. A height of the super-aligned carbon nanotube array is about 200 μm to about 400 μm.

The super-aligned carbon nanotube array formed under the above conditions is essentially free of impurities such as carbonaceous or residual catalyst particles. The plurality of carbon nanotubes can be obtained by removing the substrate.

In one embodiment, the diameter of each of the plurality of carbon nanotube is about 20 to 30 nanometers, and the length of each of the plurality of carbon nanotube is about 300 micrometers.

In the step 2, the plurality of carbon nanotubes are pre-oxidized.

After the plurality of carbon nanotubes are pre-oxidized, a plurality of sites with negative charge, such as oxygen-containing functional groups, can be formed on surfaces of the plurality of carbon nanotubes. A manner of the pre-oxidation of the plurality of carbon nanotubes is not limited. In one embodiment, the plurality of carbon nanotubes can be heated for a period of time in an atmosphere of oxygen, carbon dioxide or air; the carbon nanotubes can be oxidized by oxygen, carbon dioxide or air. In another embodiment, the plurality of carbon nanotubes are immersed into an oxidizing solution such as hydrogen peroxide or a acid solution for a period of time; the carbon nanotubes can be oxidized by the oxidizing solution. The acid solution can be a strong acid such as a sulfuric acid ($H_2SO_4$), a hydrochloric acid (HCl) or a nitric acid ($HNO_3$). What should be noted is that, the carbon nanotubes can be etched or corroded by a strong oxidizing agent such as oxygen or a strong acid, and a plurality of defect sites can be formed on surfaces of the plurality of carbon nanotubes. In one embodiment, the plurality of defect sites refer to a plurality of pores on surfaces of the plurality of carbon nanotubes.

In one embodiment, the method of pre-oxidizing the plurality of carbon nanotubes comprises: placing the super-aligned carbon nanotube array of the step 1 in air; heating the super-aligned carbon nanotube array to 550° C. for about 30 minutes. After the pre-oxidization process, the plurality of pores are formed on surfaces of the plurality of carbon nanotubes.

In the step 3, the plurality of pre-oxidized carbon nanotubes are dispersed in a solvent via a sonication-assisted method, and a first suspension is formed.

After the plurality of carbon nanotubes are pre-oxidized, a wettability and dispersity of the plurality of carbon nanotubes can be increased. Therefore, the pre-oxidized carbon nanotubes can be easily and uniformly dispersed in the solvent.

The solvent can be an organic solvent, water, or a mixed solvent of organic solvent and water. In order to prevent the transition metal oxyacid radicals from reacting with other substances in the step S4, in one embodiment, the solvent is deionized water. In addition, when the solvent is water, the transition metal oxyacid radicals can react with the pre-oxidized carbon nanotubes in water. Therefore the battery electrode prepared in the step S5 can comprise the structural water. The structural water facilitates the fast charge transfer and electrochemical reactivity.

Since the plurality of carbon nanotubes are easily agglomerated in water, the plurality of carbon nanotubes can be dispersed uniformly in a water-miscible organic solvent first, and then the water-miscible organic solvent is gradually replaced with water. In this way, the solvent of the first suspension can be water.

In one embodiment, after being pre-oxidized, the plurality of carbon nanotubes are dispersed uniformly in ethanol first, and then the ethanol is gradually replaced with the deionized water.

In the step S4, a material containing transition metal oxyacid radicals is dispersed in the first suspension, and a second suspension is formed.

The material containing transition metal oxyacid radicals can be a transition metal oxyacid or a transition metal oxyacid salt. A valence of a transition metal element in the material must be higher than that of the transition metal element in the transition metal oxide to be prepared. Wherein, the transition metal oxyacid can be selected from a group consisting of permanganic acid ($HMnO_4$), titanic acid ($H_4TiO_4$), chromic acid ($H_2CrO_4$), dichromic acid ($H_2Cr_2O_7$), ferric acid ($H_2FeO_4$), cobalt acid ($H_3CoO_4$), molybdenum acid ($H_2MoO_4$), vanadic acid ($H_3VO_4$), and combinations thereof. The transition metal oxyacid salt can be selected from a group consisting of permanganate, titanate, chromate, dichromate, ferrate, cobaltate, molybdate, vanadate, and combinations thereof. The transition metal oxyacid salt can be potassium permanganate ($KMnO_4$), potassium titanate ($K_4TiO_4$), potassium chromate ($K_2CrO_4$), potassium dichromate ($K_2Cr_2O_7$), potassium ferrate ($K_2FeO_4$), potassium cobaltate ($K_3CoO_4$), potassium molybdate ($K_2MoO_4$), potassium vanadate ($K_3VO_4$).

The material containing transition metal oxyacid radicals can be added to the first suspension directly. Alternatively, a suspension of the material is formed first and then is mixed with the first suspension. The material containing transition metal oxyacid radicals can be dispersed in the first suspension uniformly by stirring. The transition metal oxyacid radicals become transition metal oxyanions in the first suspension. During the process of stirring, a redox reaction between the transition metal oxyanions and the plurality of sites with negative charge occurs to form a plurality of transition metal oxide nanoparticles. The plurality of transition metal oxide nanoparticles are chemically combined with the plurality of carbon nanotubes through C—O-M bonds. The C—O-M bond is formed by an oxygen atom bonded between a metal atom of the transition metal oxide and a carbon atom of the carbon nanotube.

The redox reaction between the transition metal oxyanions and the pre-oxidized carbon nanotubes needs no heating and can be carried out at room temperature. Moreover, during the redox reaction, the transition metal oxyanions can be uniformly contacted with the plurality of pre-oxidized carbon nanotubes by continuously stirring. Thereby the plurality of transition metal oxide nanoparticles produced can be uniformly distributed in the battery electrode.

In one embodiment, the material containing transition metal oxyacid radical is $KMnO_4$. The $KMnO_4$ is added into the first suspension to form a mixed solution. The mixed solution is stirred by a magnetic bar for 1 day to 8 days at room temperature. During the process above, the $KMnO_4$ reacts with the plurality of pre-oxidized carbon nanotubes to produce a plurality of $MnO_2$ nanoparticles on surfaces or in pores of the plurality of carbon nanotubes.

In the step S5, the solvent is removed from the second suspension. The second suspension is dried to form the battery electrode.

The solvent in the second suspension can be filtered out by vacuum filtration. A remaining substance comprises the plurality of carbon nanotubes and the plurality of transition metal oxide nanoparticles. The plurality of carbon nanotubes are entangled and closely combined with each other to form a free-standing and flexible film structure. The plurality of transition metal oxide nanoparticles are uniformly distributed in the film structure.

In one embodiment, the deionized water in the second suspension is removed by vacuum filtration, and a composite film structure comprising the plurality of carbon nanotubes and the plurality of $MnO_2$ nanoparticles is obtained. The composite film structure is free-standing and highly conductive, therefore it can be used directly as a battery electrode, and no extra binders, conductive agents and current collectors are needed.

FIG. 2-FIG. 11 shows a series of characterization of the composite film structure prepared above. Wherein, the pristine CNT is the carbon nanotubes without any treatment, the air-CNT is the carbon nanotubes oxidized by the air, and the $MnO_2$/aCNT is a product of the redox reaction between the air-CNT and the $KMnO_2$.

Figure 2:
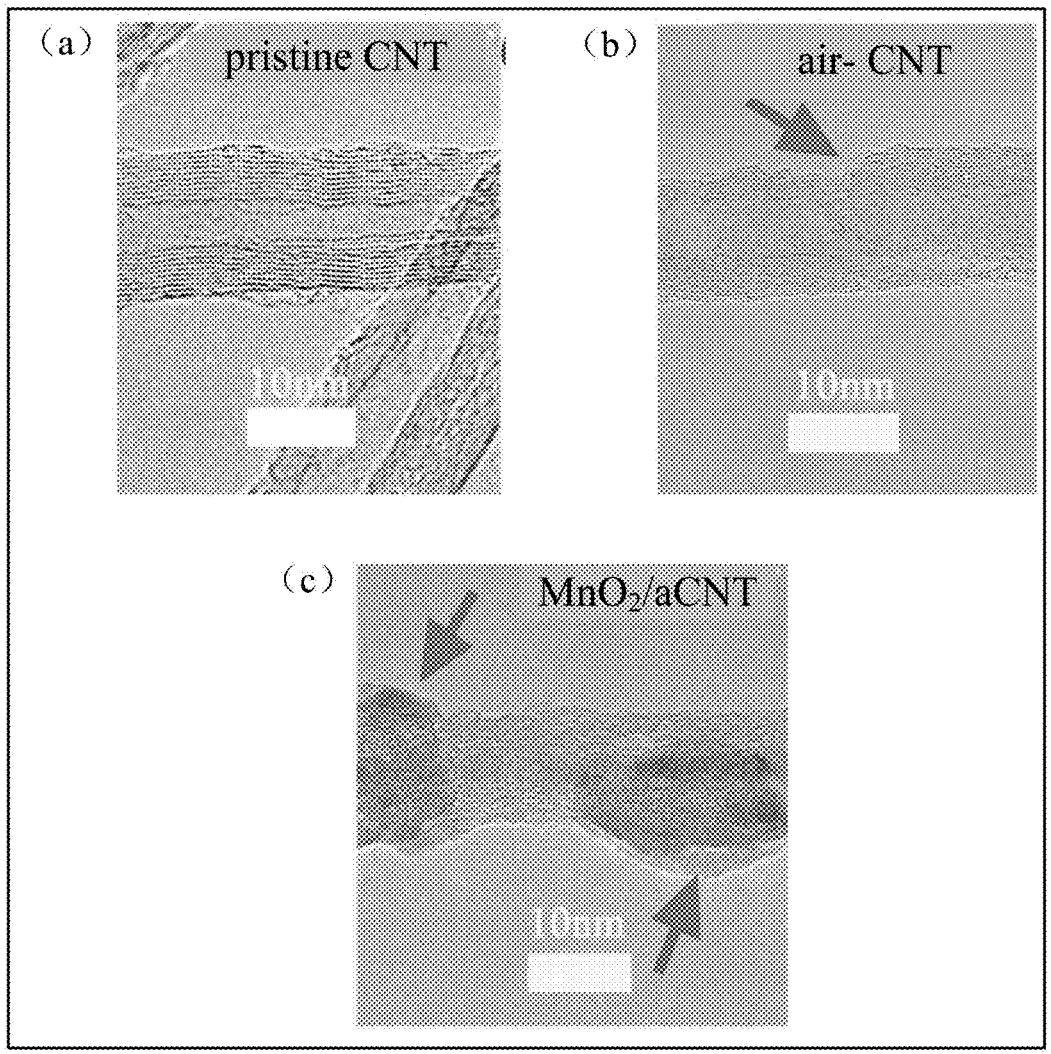
FIG. 2 shows transmission electron microscope (TEM) images of a pristine CNT, an air-CNT and an $MnO_2$/aCNT, respectively.

Referring to FIG. 2, the surface of the pristine CNT is smooth. The surface of the air-CNT is corroded and formed with defective sites. During the reaction of the $KMnO_4$ with the air-CNT, nanoparticles are formed on the surfaces of the carbon nanotubes.

Figure 3:
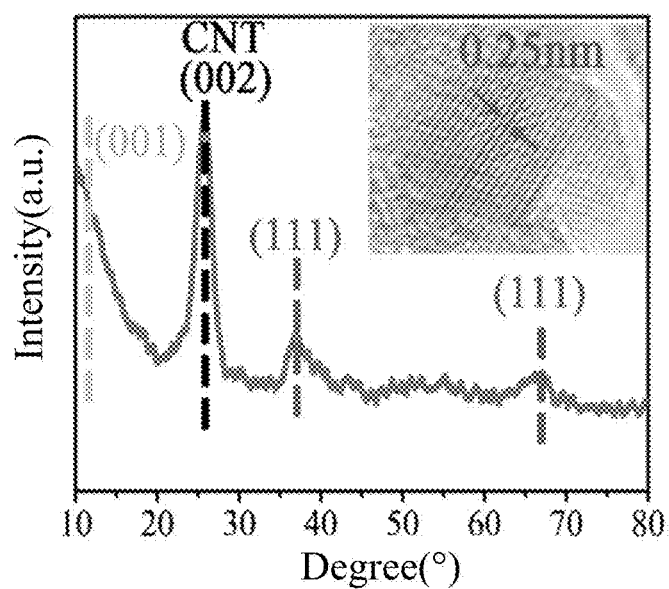
FIG. 3 shows an X-ray diffraction (XRD) pattern of an $MnO_2$/aCNT composite film structure.
Figure 4:
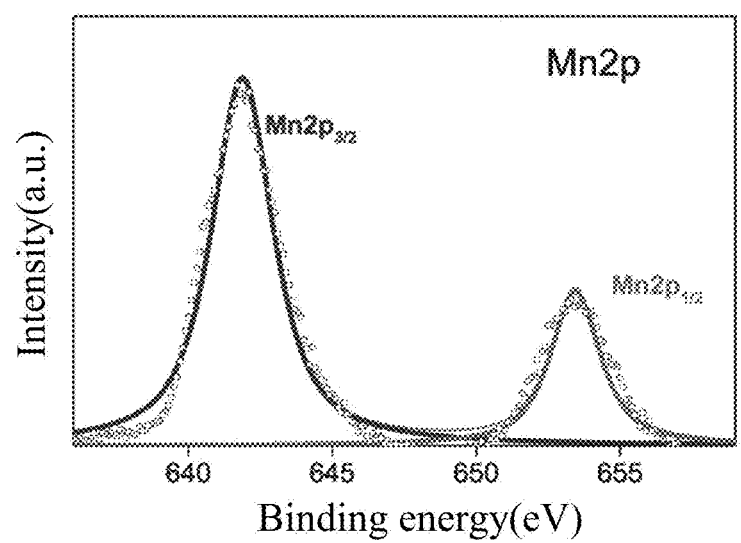
FIG. 4 shows an Mn 2p X-ray photoelectron spectroscopy (XPS) diagram of the $MnO_2$/aCNT composite film structure.

The nanoparticles on the surfaces of the carbon nanotubes are further identified as δ-$MnO_2$ referring to FIG. 3 and FIG. 4. As is shown in FIG. 3, the strong peak at around 26° in the XRD pattern is attributed to the (002) crystal planes of the graphite lattice in the air-CNT. Other peaks match well with those of birnessite-type δ-$MnO_2$ phase. An interplanar $d_{100}$-spacing of 0.25 nm observed in $MnO_2$ nanocrystals (As is shown in FIG. 3 inset) is also consistent with literature report for monoclinic birnessite-type δ-$MnO_2$. FIG. 4 demonstrated the core level binding energy for Mn 2p peaks. The binding energy for Mn $2p_{3/2}$ and Mn $2p_{1/2}$ are observed at 642.0 and 653.5 eV, which are close to $Mn^{4+}$ oxidation state.

Figure 5:
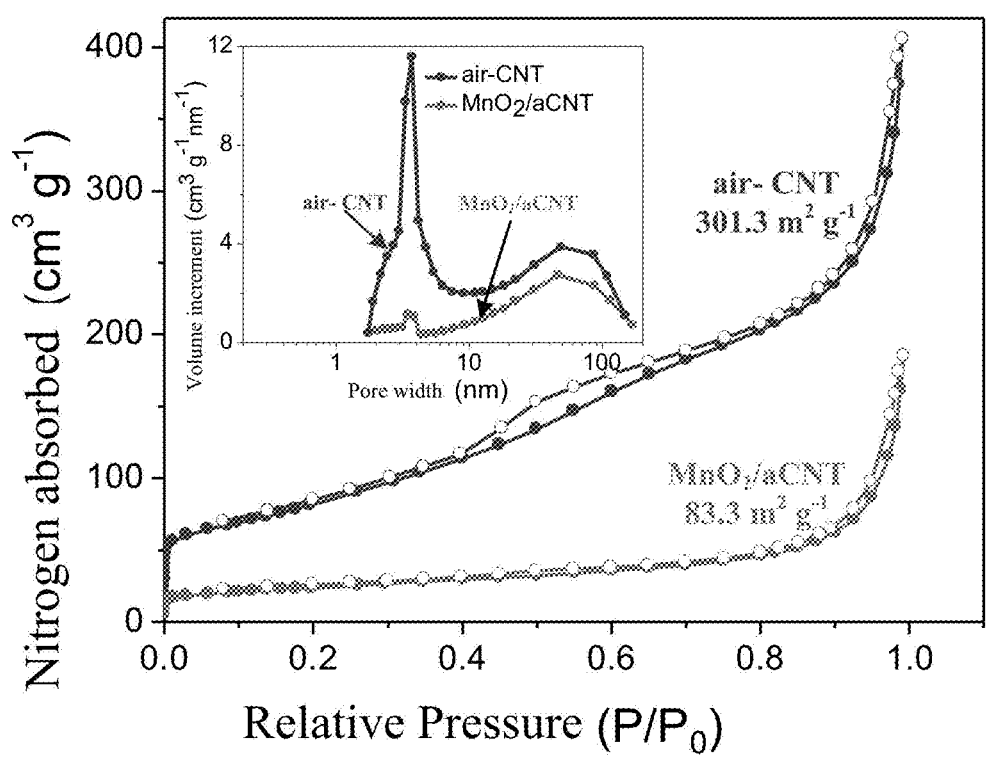
FIG. 5 shows diagrams of nitrogen adsorption-desorption isotherm of the air-CNT and the $MnO_2$/aCNT composite film structure.

As is shown in FIG. 5 and FIG. 5 inset, a plurality of pores are formed on the surfaces of the air-CNT, and sizes of the pores mainly concentrate at 3.7 nm and 62 nm. However, after the redox reaction between the air-CNT and the $KMnO_4$, a specific surface area of the air-CNT decreases and the pores of 3.7 nm almost disappear. Therefore, the $MnO_2$ nanoparticles are formed on surfaces of the air-CNT and in the pores of the air-CNT.

Figure 6:
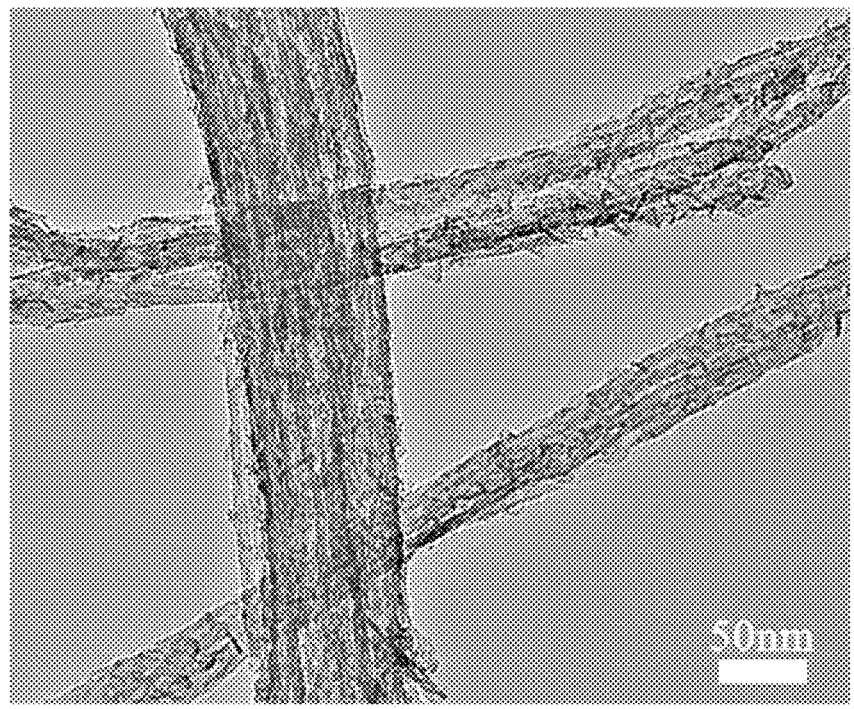
FIG. 6 shows a TEM image of the $MnO_2$/aCNT composite film structure.

As is shown in FIG. 6, a size of the $MnO_2$ nanoparticles is about 10 nm. The ultrathin $MnO_2$ nanoparticles are either uniformly anchored on surfaces of the air-CNT or encapsulated between adjacent nanotubes. No extra $MnO_2$ nanoparticles agglomerated outside the CNT bundles.

Figure 7:
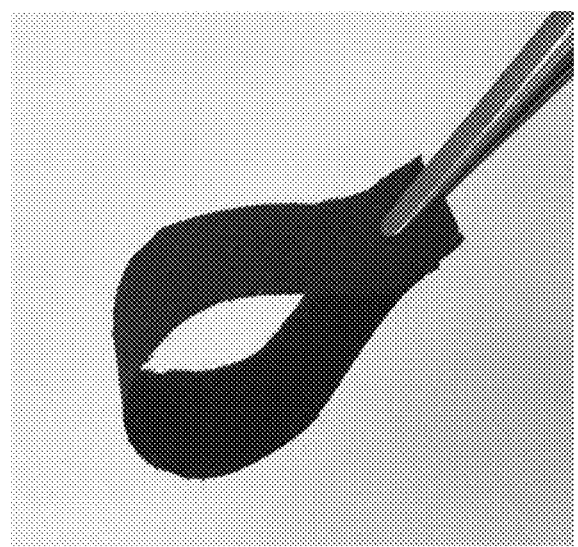
FIG. 7 shows a photograph of the $MnO_2$/aCNT composite film structure.

As is shown in FIG. 7, the $MnO_2$/aCNT composite film structure is free-standing and flexible, and can be used directly as a battery electrode.

Figure 8:
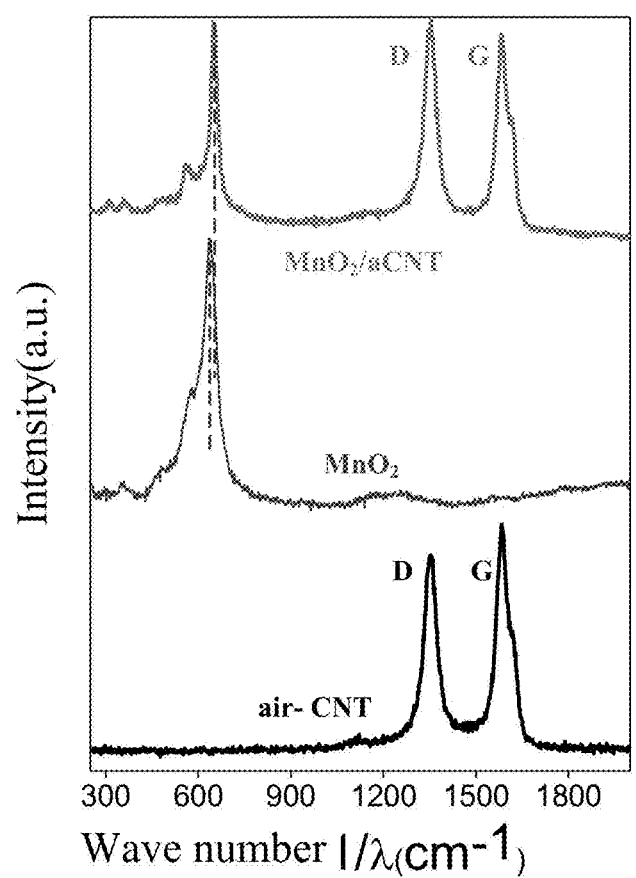
FIG. 8 shows a Raman spectra of the air-CNT, an $MnO_2$ powder and the $MnO_2$/aCNT composite film structure, respectively.

As is shown in FIG. 8, two Raman peaks locate at 1348 $cm^{-1}$ (D peak) and 1582 $cm^{-1}$ (G peak) in the Raman spectra of the air-CNT and the $MnO_2$/aCNT composite film structure. A relative value of an intensity of a D peak represents an amount of $sp^3$ carbon atoms. That is, a six-membered ring of the multi-walled carbon nanotube is destroyed, and an destroyed location of the six-membered ring can be an oxidation site. The relative value of the intensity of a G peak represents an amount of $sp^2$ carbon atoms. That is, the six-membered ring of the multi-walled carbon nanotube is intact and not destroyed. It is shown that the process of producing $MnO_2$ nanoparticles basically retains the structure of the air-CNT. An increased intensity ratio of D peak to G peak suggests a higher defect concentration of the air-CNT due to $KMnO_4$ oxidation. In addition, both the Raman peak at 634 $cm^{-1}$ of the $MnO_2$ powder and the Raman peak at 650 $cm^{-1}$ of the $MnO_2$/aCNT composite film structure are correspond to a stretching vibration of the Mn—O bond. A frequency difference of $MnO_2$ (634 $cm^{-1}$) and the $MnO_2$/aCNT composites (650 $cm^{-1}$) can be correlated to shorter Mn—O chemical bonds due to the local lattice distortion by $K^+$ incorporation into a interlayer region.

Figure 9:
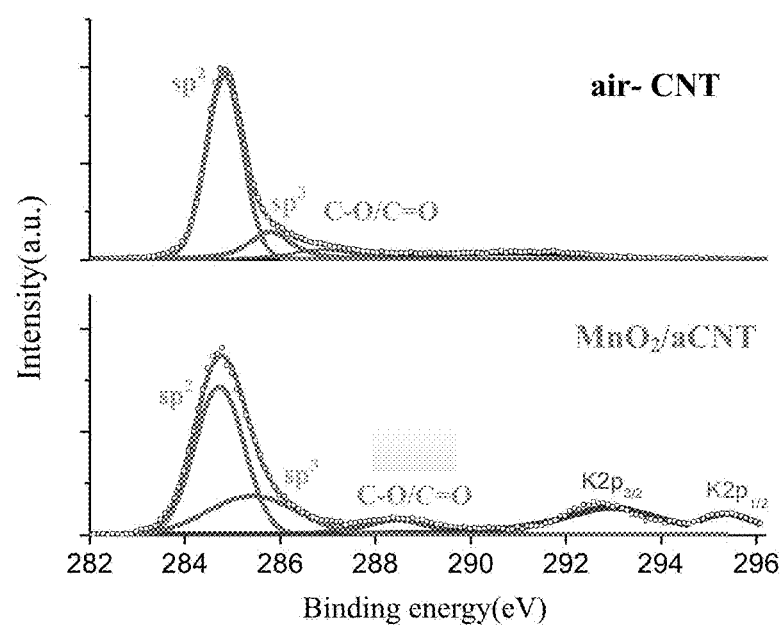
FIG. 9 shows carbon (C) is and K 2p XPS diagrams of the air-CNT and the $MnO_2$/aCNT composite film structure.
Figure 10:
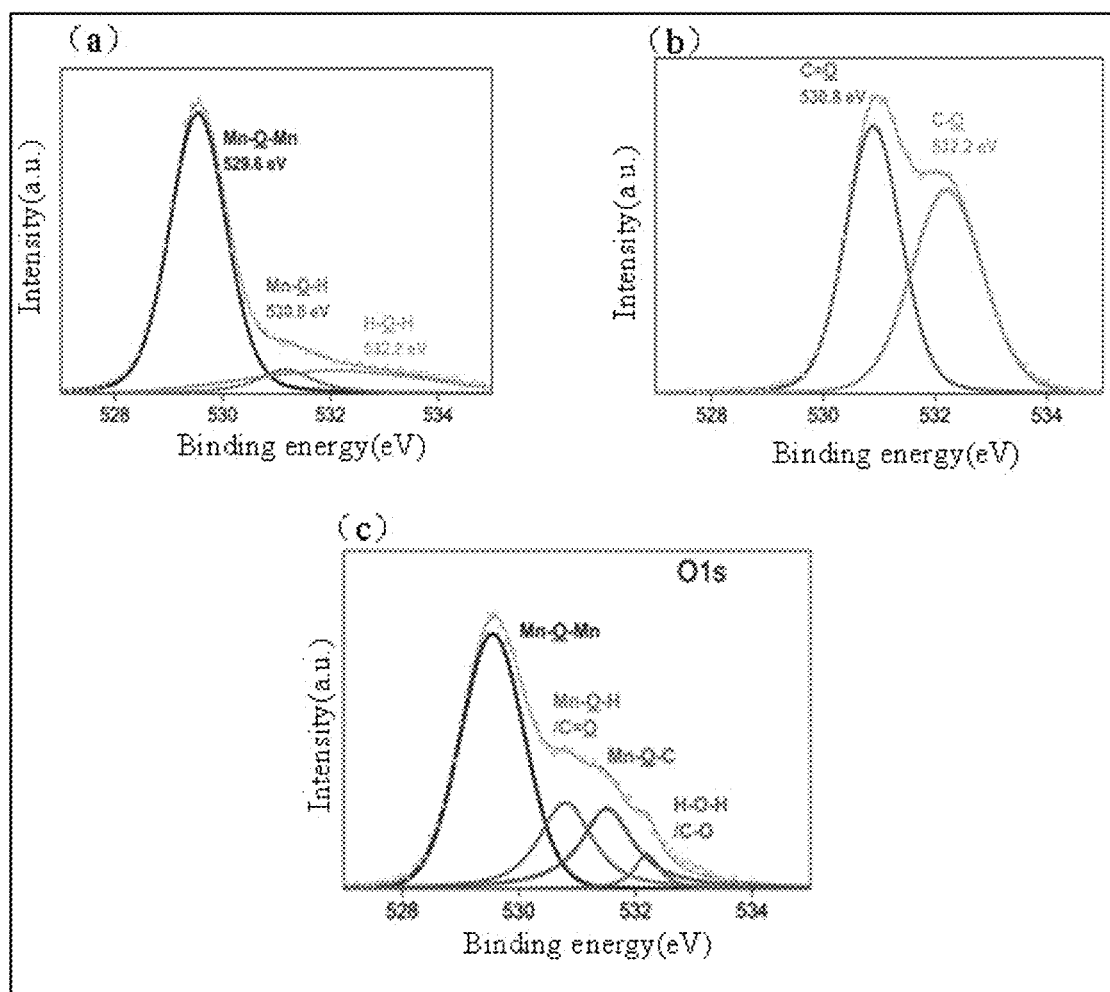
FIG. 10 shows oxygen (O) is XPS diagrams of the $MnO_2$ powder, the air-CNT and the $MnO_2$/aCNT composite film structure, respectively.

As is shown in FIG. 9, a presence of $K^+$ in $MnO_2$/aCNT composite film structure is further indicated by two peaks located at 292.9 and 295.5 eV related to K $2p_{3/2}$ and K $2p_{1/2}$ levels in XPS spectra. Excess $K^+$ in the interlayer region can stabilize a two-dimensional structure of $MnO_2$ and improve a cycling stability of the $MnO_2$/aCNT electrode.

Referring to FIG. 10(a), for the $MnO_2$ powder, three peaks located at 529.6 eV, 530.8 eV and 532.2 eV are assigned to oxide (Mn—O bonds), and hydroxide (Mn—O—H bonds) and structural water (H—O—H bonds), respectively. Referring to FIG. 10(b), for the air-CNT, two peaks located at 530.8 eV and 532.2 eV are ascribed to C=O and C—O bonds, respectively. Referring to FIG. 3e, for the $MnO_2$/aCNT composite film structure, four peaks appearing at 529.6 eV, 530.8 eV, 531.5 eV and 532.2 eV, correspond to oxide (Mn—O—Mn), hydroxide (Mn—O—H)/C=O bonds, C—O—Mn bonds and structural water (H—O—H)/C—O bonds, respectively. Wherein, compared with the $MnO_2$ powder and the air-CNT, an extra peak of 531.5 eV of the $MnO_2$/aCNT composite film structure indicates a large fraction of C—O groups can come from the C—O—Mn bonds at an interface between the air-CNT and the $MnO_2$. Oxygen-containing groups on carbon templates can capture and react with various metal anions (such as $VO_3^-$, $MnO_4^-$, $MoO_4^-$), and metal oxide can be produced. The $MnO_2$ nanoparticles and the carbon nanotubes are chemically hybridized with each other through the C—O—Mn bonds. The robust interaction can prevent the active materials detaching from the carbon nanotubes during cycles and agglomerating on the surface of the carbon nanotubes.

Figure 11:
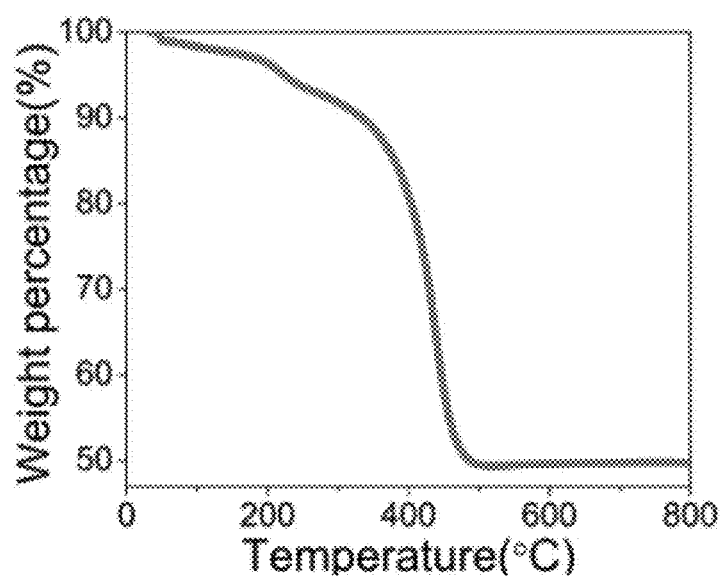
FIG. 11 shows a thermogravimetric analysis (TGA) curve of the $MnO_2$/aCNT composite film structure.

Referring to FIG. 11, water contained in the $MnO_2$/aCNT composite film structure can be divided into physically adsorbed water and chemisorbed structural water, wherein the former can be evaporated at 100° C. and the latter can be removed at 100-300° C. The $MnO_2$/aCNT composite film structure suffers a serious mass loss at the temperature in a range from about 300° C. to about 500° C., as the air-CNT of the $MnO_2$/aCNT composite film structure become gas due oxidation reaction. A last remaining material is the $MnO_2$ nanoparticles. In the MnO2/aCNT composite film structure, a mass fraction of the $MnO_2$ nanoparticles is estimated to about 50 wt %, the mass fraction of the air-CNT is about to 42 wt %, and the mass fraction of the structural water is estimated to a moderate amount of 4-7 wt %. The structural water is supposed to facilitate the fast charge transfer and electrochemical reactivity.

In summary, the $MnO_2$/aCNT composite film structure prepared in the embodiment is a flexible and self-supporting structure. Wherein, $MnO_2$ is a δ phase. The size of the $MnO_2$ nanoparticles is less than 10 nanometers. The $MnO_2$ nanoparticles are uniformly distributed on the surface of the carbon nanotubes or in the pores of the carbon nanotubes, and the $MnO_2$ nanoparticles are tightly bound to the carbon nanotubes by C—O—Mn chemical bonds. In addition, the $MnO_2$/aCNT composite film structure also comprises $K^+$ and structural water. The $K^+$ and structural water can be beneficial to stabilize the $MnO_2$/aCNT composite film structure and prevent the $MnO_2$ nanoparticles from detaching from the surfaces of the carbon nanotubes under high current charge and discharge.

A hybrid energy storage device is further provided in one embodiment. Wherein, the hybrid energy storage device comprises two electrodes, and one of the two electrodes of the hybrid energy storage device can be the battery electrode as mentioned above.

In order to further illustrate a performance of the battery electrode and the hybrid energy storage device, two comparative embodiment and one blank embodiment are utilized in the present disclosure.

Embodiment 1

Preparing the $MnO_2$/aCNT electrode: a super-aligned carbon nanotube array is placed in air and heated to 550° C. at a rate of 15° C. per minute. Then, the super-aligned carbon nanotube array is heated at 550° C. for 30 minutes to prepare the air-CNT. 100 mg air-CNT are dispersed into the deionized water via ultra-sonication to prepare a carbon nanotube suspension. Then 1.0 g $KMnO_4$ are added into the carbon nanotube suspension to obtain a mixed solution. The mixed solution is stirred by magnetic bar for 6 days at room temperature. The deionized water in the second suspension is removed via vacuum filtration to obtain the $MnO_2$/aCNT electrode. The electrode is free-standing and no extra current collectors or binders are needed.

Preparing a battery: a coin-type (CR 2016) half-cell is assembled in an Ar-filled glove box. The $MnO_2$/aCNT electrode is treated as a working electrode and a lithium foil is worked as a reference electrode. A polypropylene film (Celgard 2400) is employed as a separator. An electrolyte is 1M $LiPF_6$ in a 1:1 weight ratio of EC:DEC.

Comparative Embodiment 1

Preparing the $MnO_2$ electrode: a conventional $MnO_2$ electrode slurry is prepared by mixing $MnO_2$ powder, carbon black, and PVDF in N-methylpyrrolidone (NMP) solvent at a weight ratio of 5:4:1. Then, the slurry is coated on a copper foil surface and dried in vacuum.

Preparing the battery: a coin-type (CR 2016) half-cell is assembled in an Ar-filled glove box. The $MnO_2$ electrode is treated as a working electrode and a lithium foil is worked as a reference electrode. A polypropylene film (Celgard 2400) is employed as a separator. An electrolyte is 1M $LiPF_6$ in a 1:1 weight ratio of EC:DEC.

Comparative Embodiment 2

Preparing the $MnO_2$/rCNT electrode: a disordered carbon nanotube array is purchased. Carbon nanotubes of the disordered carbon nanotube array are randomly grown and oriented. The commercial randomly oriented carbon nanotubes are denoted as rCNT. The rCNT are treated following the same procedure as the embodiment 1 to prepare $MnO_2$/rCNT composite materials. The $MnO_2$/rCNT composite materials are not free-standing structure and can not serve as a conductive scaffold, so the current collector, conductive agent and binder are needed. The $MnO_2$/rCNT composite materials, carbon black, and PVDF are mixed in N-methylpyrrolidone (NMP) solvent to obtain a slurry. Then, the slurry is coated on a copper foil surface and dried in vacuum.

Preparing the battery: a coin-type (CR 2016) half-cell is assembled in an Ar-filled glove box. The $MnO_2$/rCNT electrode is treated as a working electrode and a lithium foil is worked as a reference electrode. A polypropylene film (Celgard 2400) is employed as a separator. An electrolyte is 1M $LiPF_6$ in a 1:1 weight ratio of EC:DEC.

Blank Embodiment

Preparing the air-CNT electrode: the air-CNT are dispersed into the deionized water to obtain a carbon nanotube suspension. Then, the deionized water of the suspension is removed via vacuum filtration to prepare the air-CNT electrode. The air-CNT electrode without $MnO_2$ coating is used as a blank sample to identify a contribution of the carbon nanotubes in the $MnO_2$/aCNT electrode.

Preparing the battery: a coin-type (CR 2016) half-cell is assembled in an Ar-filled glove box. The air-CNT electrode is treated as a working electrode and a lithium foil is worked as a reference electrode. A polypropylene film (Celgard 2400) is employed as a separator. An electrolyte is 1 M $LiPF_6$ in a 1:1 weight ratio of EC:DEC.

A series of tests are performed on the four electrodes, as is shown in FIG. 12-FIG. 17.

Figure 12:
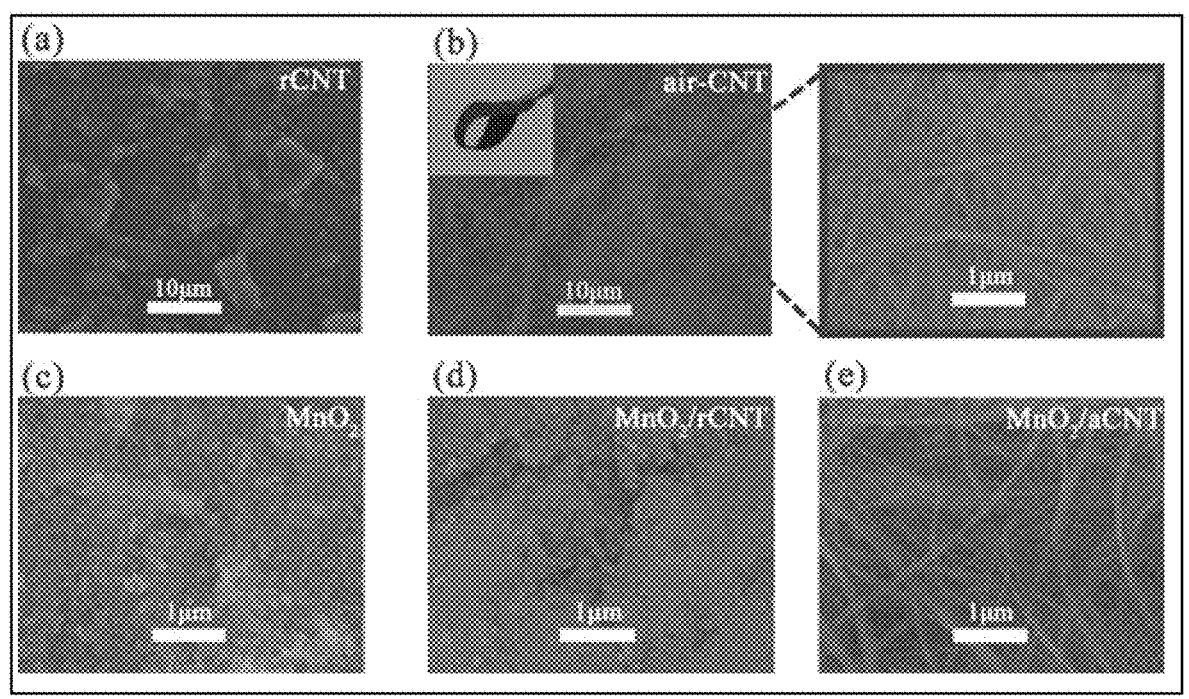
FIG. 12 shows scanning electron microscope (SEM) images of a rCNT, the air-CNT, a $MnO_2$ electrode, a $MnO_2$/rCNT electrode and a $MnO_2$/aCNT electrode, respectively.

Referring to FIG. 12, the rCNT are highly agglomerated together, so the rCNT can not work as a conductive network (FIG. 12a). Although the continuous spinning-like air-CNT can no longer maintain a super-aligned structure after ultra-sonication, but the air-CNT can still be used as a three-dimensional conductive scaffold (FIG. 12b). An aggregation of conductive agents and $MnO_2$ particles can be seen in the $MnO_2$ electrode because the $MnO_2$ particles are prone to aggregate into a spherical shape (FIG. 12c). Since the rCNT can not serve as a conductive scaffold, the $MnO_2$/rCNT electrode displays a similar morphology to the conventional $MnO_2$ electrode. The morphology of the air-CNT is similar to that of the $MnO_2$/aCNT electrode. Thus, the $MnO_2$ nanoparticles is uniformly coated onto carbon templates without aggregation, which is in accordance with TEM images discussed above.

Figure 13:
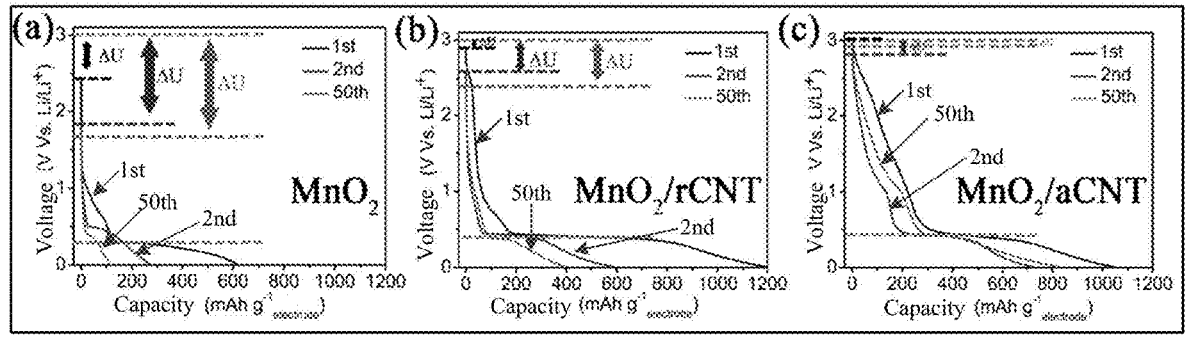
FIG. 13 shows discharge and charge curves of the $MnO_2$ electrode, the $MnO_2$/rCNT electrode, and the $MnO_2$/aCNT electrode, respectively.

Referring to FIG. 13, compared with the $MnO_2$ electrode and the $MnO_2$/rCNT electrode, the $MnO_2$/aCNT electrode exhibits three unique features: (1) a voltage drop (AU, when charging is switched to discharging) is small ($\Delta U_{1st}$=0 V, $\Delta U_{2nd}$=0.22 V, $\Delta U_{50th}$=0.08 V), reflecting a low contact resistance between the active materials and the carbon nanotubes. The low contact resistance can be ascribed to an intimate chemical contact by C—O—Mn bonds. (2) For the $MnO_2$/aCNT electrode, a retention rate of an initial capacity after the first cycle is as high as 70%. While for the other two electrodes, the retention rate of an initial capacity after the first cycle is less than 50%. Compared with the other two electrodes, the advantage of the $MnO_2$/aCNT electrode may stem from that a solid electrolyte interface (SEI) film can be easier to be formed. In the $MnO_2$/aCNT electrode, oxygen-containing functional groups and smooth surfaces of carbon nanotubes can facilitate a formation of the SEI film. (3) During the 50th cycle, the capacity of the $MnO_2$/aCNT electrode is increased compared to the second cycle. Two phenomena exist in the three electrodes: on the one hand, it usually takes 0.5 to 2 weeks for the electrolyte to infiltrate the electrode completely. At this time, all $MnO_2$ nanoparticles are activated to become active materials in reaction. Therefore, all $MnO_2$ electrodes would experience an initial capacity rise. On the other hand, due to a polarization of the lithium-ion batteries, irreversible changes such as a loss of active materials can result in a decrease of the discharge capacity with an increase of the cycle number. The polarization of the $MnO_2$/aCNT electrode is small and the former is dominant, so the capacity of the first 50th cycle can rise; while the other two electrodes are severely polarized and the latter is dominant, so the capacity continues to decrease.

Figure 14:
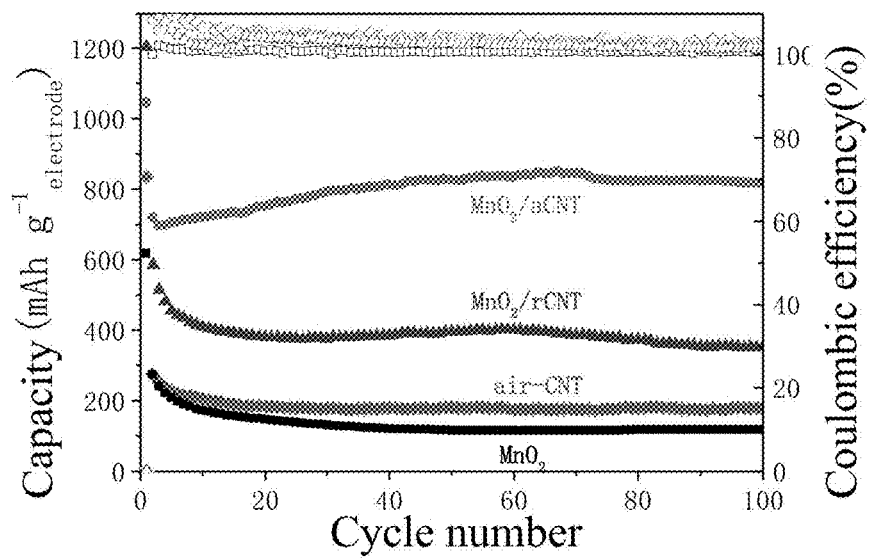
FIG. 14 shows cyclic performance of the $MnO_2$ electrode, the $MnO_2$/rCNT electrode, the air-CNT electrode and the $MnO_2$/aCNT electrode at a charge/discharge current of 0.2 $Ag^{-1}$.

Referring to FIG. 14, the $MnO_2$/aCNT electrode delivers discharge capacities of 1043.5 $mAhg^{-1}$ and 718.3 $mAhg^{-1}$ for the initial and second cycle, respectively. The capacity keeps increasing after the $3^{rd}$ cycle, and a maximum capacity of 843.8 $mAhg^{-1}$ is achieved at the $70^{th}$ cycle. The capacity of the $MnO_2$/aCNT electrode even exceeds its theoretical specific capacity (taking the $70^{th}$ cycle into an example): the MnO$_2$/aCNT electrode contains three main components of air-CNT, MnO$_2$ and structural water at a weight ratio of 42:50:8. The air-CNT exhibits 175.3 mAhg$^{-1}$ in the $70^{th}$ cycle and the theoretical capacity of MnO$_2$ is 1233 mAhg$^{-1}$, so the upper limit of the discharge capacity of the MnO$_2$/aCNT electrode is supposed to be 774 mAhg$^{-1}$ (175.3 mAhg$^{-1}$×45%+1233 mAhg$^{-1}$×50%+0×5%=774 mAhg$^{-1}$). However, a discharge capacity of 843.8 mAhg$^{-1}$ can be delivered in actual. The excess capacity may stem from an interfacial capacitive-like lithium storage behavior between the MnO$_2$ and the carbon nanotubes. The lithium-ions can be compensated by electrons on surfaces of the carbon nanotubes. In comparison, the performances of the other three electrodes are poor. For the MnO$_2$/rCNT, the air-CNT and the MnO$_2$ electrodes, initial capacities of 1203.8, 835.4 and 616.5 mAhg$^{-1}$ degrade to 380.2, 182.7 and 145.4 mAhg$^{-1}$ after 20 cycles, respectively. The MnO$_2$/aCNT electrode exhibits superior cycle stability compared to the other three electrodes.

Figure 15:
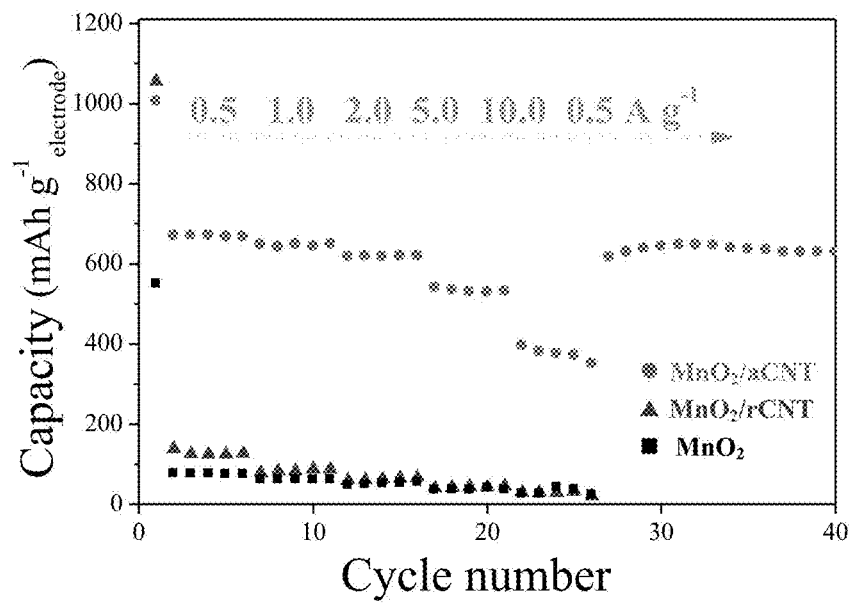
FIG. 15 shows rate tests of the $MnO_2$ electrode, the $MnO_2$/rCNT electrode and the $MnO_2$/aCNT electrodes at a constant discharge rate of 0.5 $Ag^{-1}$.

Referring to FIG. 15, the MnO$_2$/aCNT electrode delivers a high reversible discharge capacity of 671.9, 649.1, 619.2, 539.9 and 395.8 mAhg$^{-1}$ at stepwise charge rates of 0.5, 1, 2, 5 and 10 Ag$^{-1}$, respectively. When the current rate is returned at 0.5 Ag$^{-1}$, the discharge capacity of the electrode is approximately 648.1 mAhg$^{-1}$. However, the other two electrodes exhibit poor rate performance: the capacity of the other two electrodes is much lower than that of the MnO$_2$/aCNT electrode at 0.5 Ag$^{-1}$; when the charge rate exceeds 2 Ag$^{-1}$, the capacity is rapidly decayed. The active materials of the MnO$_2$ electrode and the MnO$_2$/rCNT electrode are easy to aggregate and detach from the current collector at high charge rates. Therefore, the rate performance of the other two electrodes is poor. Compared to the other two electrodes, the MnO$_2$/aCNT electrode also exhibits superior rate performance.

Figure 16:
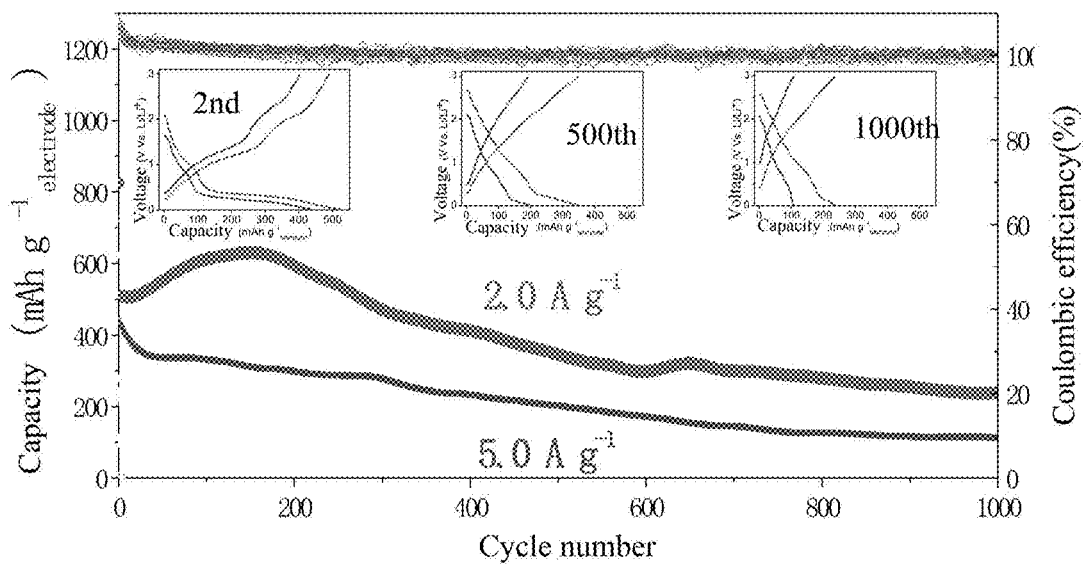
FIG. 16 shows long cycle tests of the $MnO_2$/aCNT electrode at a high charge/discharge current of 2 $Ag^{-1}$ and 5 $Ag^{-1}$, respectively.
Figure 17:
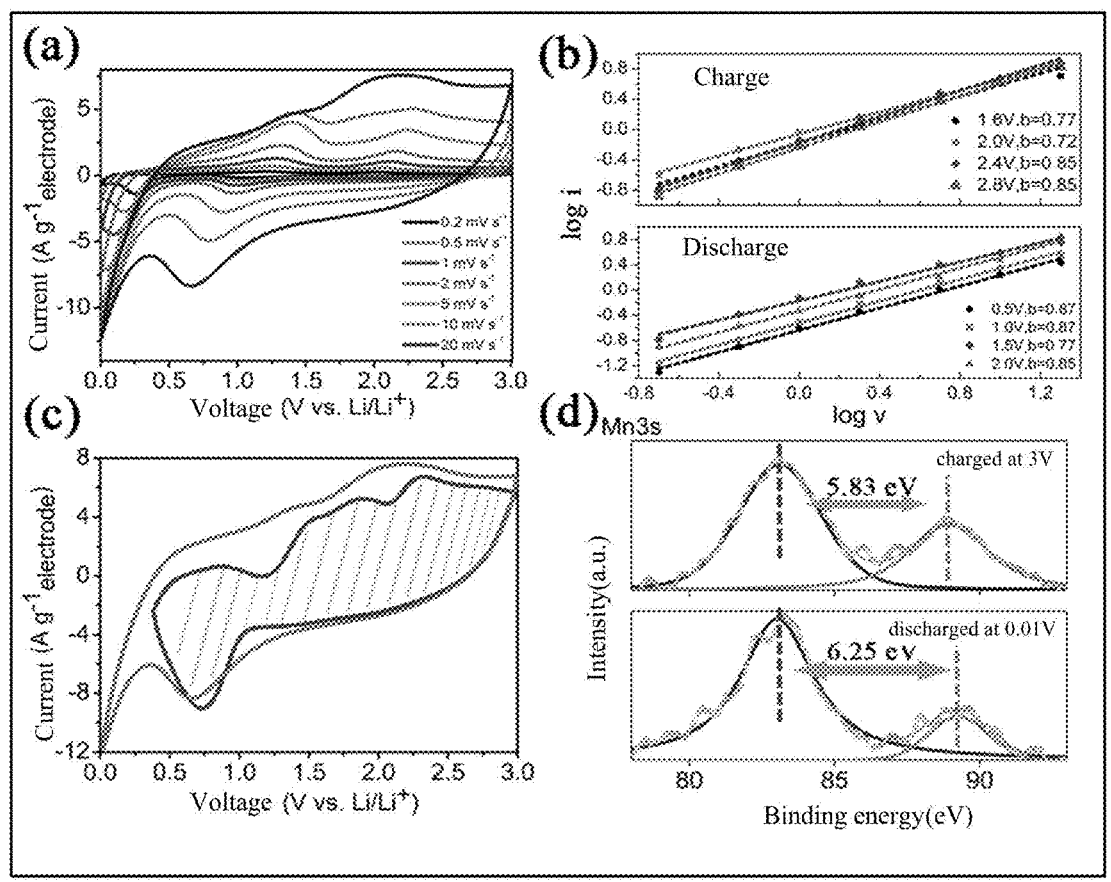
FIG. 17 shows kinetic analysis of the $MnO_2$/aCNT electrode.

Referring to FIG. 16, at 2 Ag$^{-1}$, the capacity of the MnO$_2$/aCNT electrode keeps increasing after the $3^{rd}$ cycle and reaches a maximum at $150^{th}$ cycle. In addition, the MnO$_2$/aCNT electrode exhibits low capacity fading rates from $800^{th}$ to $1000^{th}$ cycle. The MnO$_2$/aCNT electrode shows excellent long cycle performance at the high charge/discharge current.

The outstanding rate performance and excellent long cycle stability of the MnO$_2$/aCNT electrode originate from the following four factors: (1) A thickness of the MnO$_2$/aCNT electrode is ultrathin. Therefore, a large fraction of surface atoms can be allowed to be contact with the electrolyte, and a diffusion path of lithium ions can be shortened and a diffusion time of lithium-ions can be reduced. (2) The robust contact between the active materials and the carbon nanotubes can prevent the active materials from detaching from the electrode during the fast charge/discharge process. Furthermore, the low contact resistance due to the strong adhesion can prevent the polarization during the conversion reaction. (3) The free-standing CNT scaffold serves as 3D continuous electron pathways. These 3D continuous electron pathways can efficiently transfer electron and alleviate polarization. (4) The K$^+$ and structural water can stabilize the electrode structure during cycles.

The outstanding rate performance of the MnO$_2$/aCNT electrode is also related to its capacitive-like storage behavior. Referring to FIG. 16 inset, in $2^{nd}$ cycle, several clear discharge/charge plateaus can be seen. The 2nd cycle is corresponding to a battery-type diffusion process. In $500^{th}$ cycle, only one obvious discharge plateaus can be identified and others become obscure. In $1000^{th}$ cycle, even the last discharge plateaus nearly disappears, and the charge/discharge curve became linear, indicating that the capacitive-like storage behavior dominates in this cycle. The capacitive-like storage behavior can be strengthened as the number of cycles increases.

As the capacitive-like storage behavior has already revealed by above experiments and results. A ratio of a contribution of the capacitive-like storage behavior is further quantified by FIG. 17.

Referring to FIG. 17a, a power law relationship between a current response (i) and a scan rate (v) can be used to reveal the storage mechanism: i=av$^b$, wherein a and b are adjustable parameters. When b equals 1, the response current is proportional to the scan rate, indicating a capacitive process. When b equals to 0.5, the response current satisfies Cottrell's equation, reflecting a diffusion-controlled process. Referring to FIG. 17b, the b value is between 0.5 and 1.0, implying that a process of lithium-ions storage is a hybrid of battery-type diffusion and capacitive-like storage.

As is shown in the FIG. 17c, a shaded area presents the contribution of capacitive charge storage at the scan rate of 20 mV s$^{-1}$. The contribution of capacitive charge storage (460 C g$^{-1}$) accounts for 65.6% of the total capacity (700 C g$^{-1}$). The contribution of battery diffusion control storage is only 240 C·g$^{-1}$. The MnO$_2$/aCNT electrode is mainly controlled by the capacitive-like behavior at the scan rate of 20 mV s$^{-1}$.

A valence state of manganese can be characterized by an interval between two main peaks of Mn 3s XPS spectrum. Referring to FIG. 17d, intervals at 3.0 and 0.01V are 5.83 and 6.25 eV, corresponding to Mn valencies of 2.4 and 2.0, respectively. Since the capacitive charge storage dominates at the scan rate of 20 mV·s$^{-1}$, a change in the valence state of manganese before and after discharge is small. The redox reaction between manganese and lithium contributes only 222 C·g$^{-1}$. This result is in agreement with the above kinetic analysis.

The MnO$_2$/aCNT electrode exhibits a hybrid characteristic of capacitor and battery. The capacitive characteristic dominates. So a large amount of energy can be rapidly received or delivered in a short time. The hybrid energy storage device using the MnO$_2$/aCNT electrode can achieve advantages of high energy density and high power density simultaneously. Wherein, a lithium-ion storage mechanism can be explained as the followings: on one hand, a part of lithium-ions are diffused into the active materials, and this process is accompanied by the redox reaction of lithium-ions and active materials; on the other hand, the other part of lithium-ions are compensated by extra electrons on surfaces of the carbon nanotubes and stored in the interface between the active materials and the carbon nanotubes.

The battery electrode provided in this disclosure comprises the following advantages.

Firstly, the transition metal oxide nanoparticles in the battery electrode are uniformly attached to the carbon nanotubes through C—O-M chemical bonds. Therefore, the transition metal oxide nanoparticles are not easy to agglomerate and detach from surfaces of the carbon nanotubes.

Secondly, the carbon nanotubes character in high elasticity and conductivity, so they can serve as conductive frameworks for the transition metal oxide nanoparticles and buffer a volume change of the active materials during the fast charge/discharge process.

Thirdly, the battery electrode further comprises structural water and alkali metal ions. Structural water and alkali metal ions can help the stability of the electrode during cycles.

Fourthly, the battery electrode need no current collector, conductive agent, or binder. The weight of the battery electrode can be reduced.

Fifth, the diameter of the transition metal oxide particles is 10 nanometers on average and the battery electrode is ultrathin. The diffusion path of lithium-ions can be shortened and the diffusion time of lithium-ions can be reduced.

The method for preparing the battery electrode provided in the disclosure comprises the following advantages.

Firstly, the transition metal oxyacid radicals react with the air-oxidized carbon nanotubes to produce the transition metal oxide nanoparticles. The transition metal oxide nanoparticles are tightly attached to the carbon nanotubes through chemical bonds. In addition, due to continuous stirring and mixing during the reaction, the transition metal oxide can be uniformly distributed in the battery electrode.

Secondly, the method can be carried out at room temperature. No reagents other than water or ethanol are needed. No toxic substances are produced during the preparation. Therefore, the method is simple and environmentally friendly.

The hybrid energy storage device provided in this disclosure can achieve advantages of battery and supercapacitor simultaneously. The hybrid energy storage device characters in low capacity fading rate, outstanding cycle stability and excellent rate performance.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A battery electrode, comprising:
a plurality of carbon nanotubes, a plurality of transition metal oxide nanoparticles, structural water, and potassium ions; wherein the plurality of transition metal oxide nanoparticles are chemically bonded to the plurality of carbon nanotubes through carbon-oxygen-metal (C—O-M) linkages, and the metal is a transition metal element, wherein surfaces of the plurality of carbon nanotubes define a plurality of pores, and the potassium ions are incorporated into an interlayer region of the plurality of transition metal oxide nanoparticles.

2. The battery electrode of claim 1, wherein the plurality of carbon nanotubes are a plurality of multi-walled carbon nanotubes.

3. The battery electrode of claim 1, wherein the plurality of carbon nanotubes are entangled and combined with each other to form a free-standing film structure.

4. The battery electrode of claim 1, wherein the transition metal oxide is selected from a group consisting of manganese dioxide, titanium dioxide, ferroferric oxide, chromic oxide, cobaltosic oxide, molybdenum dioxide, vanadium dioxide, and combinations thereof.

5. The battery electrode of claim 1, wherein the plurality of transition metal oxide nanoparticles are deposited on surfaces of the plurality of carbon nanotubes or in the plurality of pores.

6. The battery electrode of claim 1, wherein the plurality of pores having a size of about 3.7 nm or about 62 nm.

7. A hybrid energy storage device, comprising:
a battery electrode comprising a plurality of carbon nanotubes, a plurality of transition metal oxide nanoparticles, structural water, and potassium ions; wherein the plurality of transition metal oxide nanoparticles are chemically bonded to the plurality of carbon nanotubes through carbon-oxygen-metal (C—O-M) linkages, the potassium ions is incorporated into an interlayer region of the plurality of transition metal oxide nanoparticles, and the metal being a transition metal element.

8. The hybrid energy storage device of claim 7, wherein the plurality of carbon nanotubes are a plurality of multi-walled carbon nanotubes.

9. The hybrid energy storage device of claim 7, wherein the plurality of carbon nanotubes are entangled and combined with each other to form a free-standing film structure.

10. The hybrid energy storage device of claim 7, wherein the transition metal oxide is selected from a group consisting of manganese dioxide, titanium dioxide, ferroferric oxide, chromic oxide, cobaltosic oxide, molybdenum dioxide, vanadium dioxide, and combinations thereof.

11. The hybrid energy storage device of claim 7, wherein surfaces of the plurality of carbon nanotubes define a plurality of pores.

12. The hybrid energy storage device of claim 11, wherein the plurality of transition metal oxide nanoparticles are deposited on surfaces of the plurality of carbon nanotubes or in the plurality of pores.

13. The hybrid energy storage device of claim 7, wherein the plurality of pores having a size of about 3.7 nm or about 62 nm.

14. The hybrid energy storage device of claim 7, wherein the potassium ions are incorporated into the interlayer region of the plurality of transition metal oxide nanoparticles, thereby local lattices formed by the carbon-oxygen-metal (C—O-M) linkages are distorted.

* * * * *